Sept. 10, 1968

J. MERCIER 3,400,537

POSITION CONTROL SYSTEM

Filed Aug. 2, 1966

INVENTOR
JEAN MERCIER

BY
ATTORNEY

INVENTOR
JEAN MERCIER
BY
ATTORNEY

United States Patent Office 3,400,537
Patented Sept. 10, 1968

3,400,537
POSITION CONTROL SYSTEM
Jean Mercier, 501 Bloomfield Ave.,
Caldwell, N.J. 07006
Filed Aug. 2, 1966, Ser. No. 569,637
Claims priority, application France, Aug. 6, 1965,
27,527; Nov. 25, 1965, 39,709; Nov. 29, 1965,
40,084; Mar. 4, 1966, 52,052
11 Claims. (Cl. 60—52)

ABSTRACT OF THE DISCLOSURE

This invention relates to the art of positioning controls and more particularly to a steering control for the rudder of a ship or the wheels of a farm tractor, in which a reversible hydraulic motor having a movable actuator has both sides of the actuator pressurized when the steering control is in neutral position.

---

Figure 1:
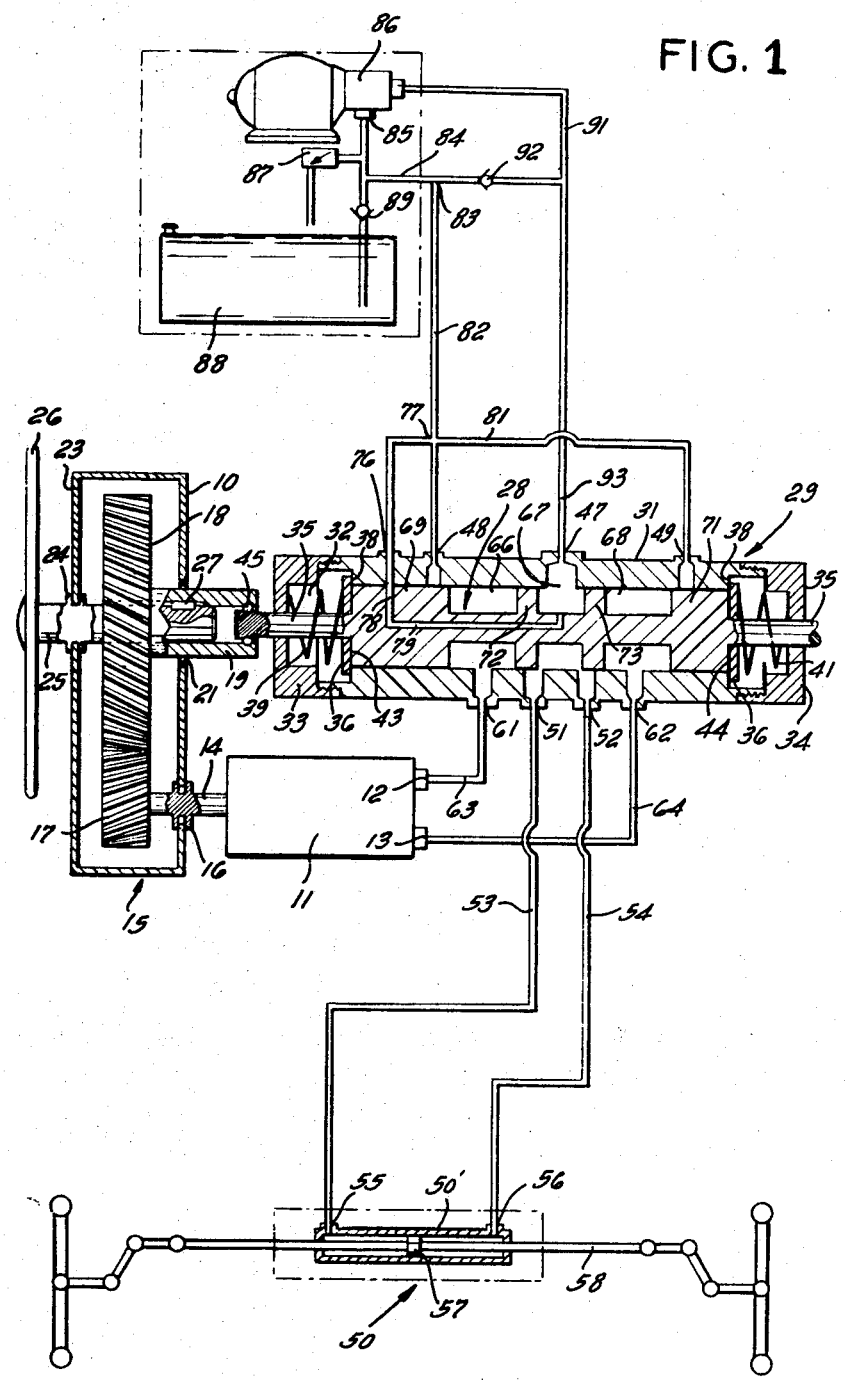

As conducive to an understanding of the invention, and for purpose of illustration, with reference to a tractor, it is noted that where the wheels of such tractor are hydraulically controlled and a reversible hydraulic actuator is used as the means to effect movement of the steerable wheels of the tractor, due to the fact that air is normally present in any hydraulic system, difficulties arise when it is attempted to maintain the tractor in a straight path. More particularly, it has been found that approximately 10% of the volume of the reversible actuator contains air under atmospheric pressure, the remaining 90% being substantially uncompressible fluid such as a hydraulic fluid.

Thus, where the tractor is being driven along a straight path in the usual bumpy or rocky field, and one of the front wheels of the tractor, for example, should strike a rock, there would be a momentary high force exerted by the resultant movement of the wheel that would instantaneously cause compression of the gas at atmospheric pressure contained in the actuator. Where, for example, 10% of the volume of the actuator contains gas under atmospheric pressure, it has been found that under normal conditions where the wheels hit a rock, the gas in the actuator will be compressed and its pressure increased to equal the force resulting from the shock to striking the rock and such gas will be compressed to say 50% of its original volume with the result that the piston of the actuator can move due to compression of the gas, and such movement where the wheels have a total range of movement of 100 degrees, would be 5% of such range or say, 5 degrees.

Consequently, even though the driver is rigidly holding the steering wheel which is not being moved, the wheels of the tractor will change their course by say 5 degrees and in order to maintain a straight path of movement the driver would have to rotate the steering wheel to overcome such change of direction. This problem is particularly important where the field over which the tractor is being driven is extremely rocky and the wheels are constantly engaging rocks in the path of movement, for the driver would have to be constantly moving the steering wheel back and forth through a relatively large arc in order to maintain the straight line of drive desired.

This problem is enhanced by the fact that normally the steering wheel has to be turned through a far greater angle than the wheels that it controls, so that where the driver has to compensate for a five degree change in direction, he may have to turn the steering wheel through an angle often in the order of 30 degrees. Because of this action it is apparent that the driver will be under constant tension and will rapidly become weary.

It is accordingly among the objects of the invention to provide a steering system which is relatively simple in construction, dependable in operation and not likely to become deranged, even after long use, and in which in neutral position when the steering wheel is not being rotated, will have the movement of the actuator greatly minimized so that shock imparted to the steerable member of the vehicle or ship will cause substantially no movement of the actuator with the result that the steerable member will remain in the direction which it has been set, thereby maintaining the vehicle or ship in its desired path without need for any substantial movement of the steering wheel.

According to the invention, these objects are accomplished by the arrangement and combination of elements hereinafter described and more particularly recited in the claims.

In the accompanying drawings in which are shown one or more of various possible embodiments of the several features of the invention, FIG. 1 is a diagrammatic view of one embodiment of the invention using an open center distributor valve, in which in neutral position fluid under pressure is applied from a source of such fluid to both sides of a fluid motor and also returned to such source.

Figure 2:
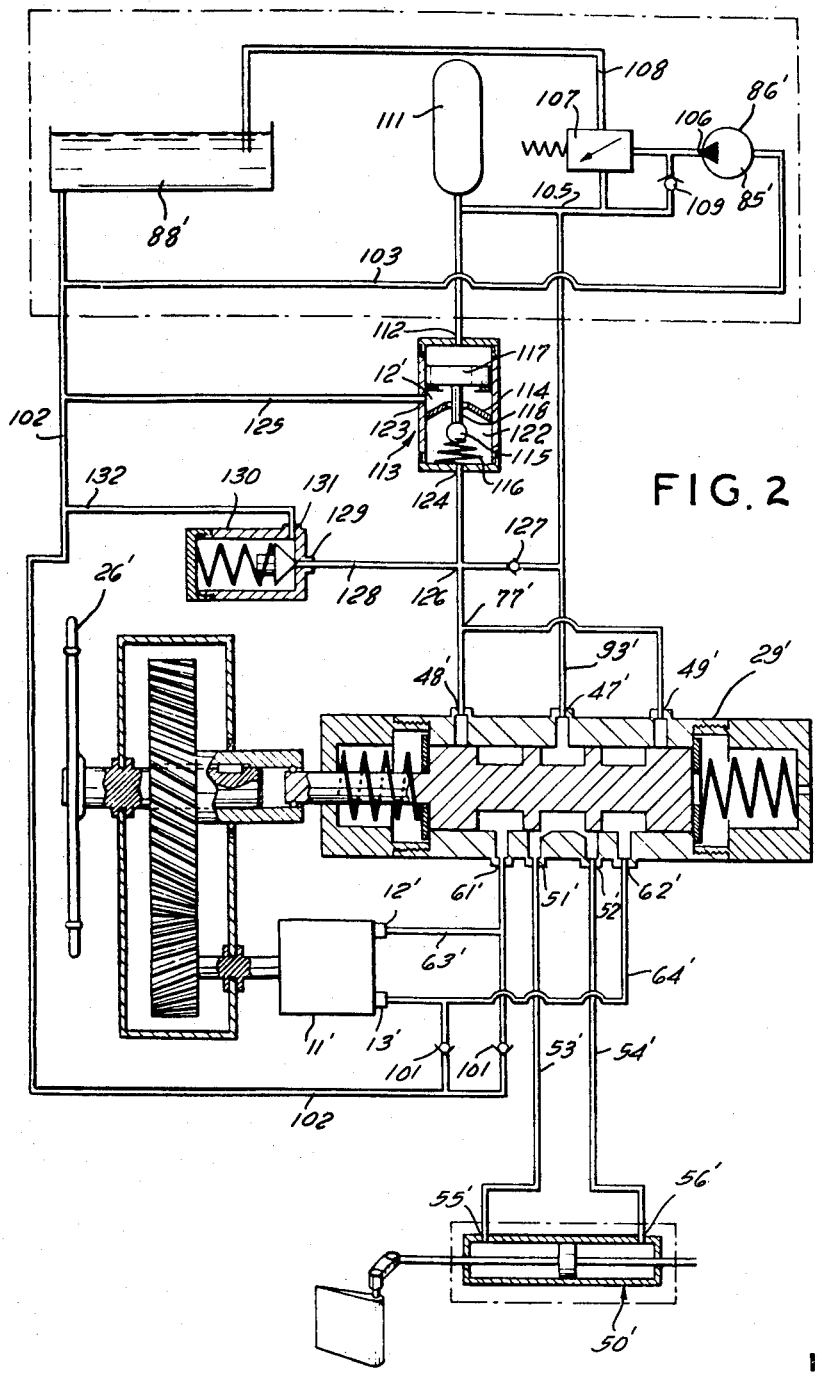

FIG. 2 is a view similar to FIG. 1 of another embodiment of the invention using a distributor valve in which in neutral position, fluid under pressure is applied from a source of such fluid to both sides of a fluid motor and not returned to the source.

Referring now to the drawings, as shown in FIG. 1, the system comprises a manually operated steering pump, illustratively a bi-directional gear pump 11 having ports 12 and 13.

The pump is actuated by means of a shaft 14 which extends through the wall 10 of a gear housing 15 and is rotatably supported in bearing 16, the inner end of the shaft 14 having a helical gear 17 secured thereto. The gear 17 meshes with a larger diameter helical gear 18 secured to a sleeve 19 slidably and rotatably mounted as at 21 in a suitable bearing carried by the wall 10 of the housing 15.

Extending through the opposed wall 23 of the housing 15 and rotatably mounted in a bearing 24 is a shaft 25, to the outer end of which a steering wheel 26 is secured. The inner end of shaft 25 extends freely through the gear 18 into the sleeve 19 and is keyed to said sleeve as at 27 so that the sleeve 19 will rotate with shaft 25 and may slide longitudinally thereof.

The longitudinal movement of sleeve 19 controls the slidable valve member 28 of a distributor valve 29. As shown in FIG. 1, the distributor valve which is of the open center type, comprises a casing 31 having a bore 32 therethrough, the ends of which are closed by end caps 33, 34. The valve member 28 has an axial stem 35 at each end which extends through a washer 36, and through the associated end caps 33, 34.

An internal annular shoulder 38 is provided near each end of bore 31 against which the respective washers are retained by an associated coil spring 39, 41. The valve member 28 is of length equal to the longitudinal distance between said shoulders 38 and the springs 39, 41 react against the ends 43, 44 of valve member 28 to retain the latter in the neutral position shown in FIG. 1.

The stem 35 extending through end cap 33 is rotatably mounted as at 45 in the end of the sleeve 19 and may be moved longitudinally with such sleeve.

The casing 31 of the valve 29 has a central port 47 and two associated ports 48, 49 on each side respectively. In addition, valve 29 has two control ports 51, 52 connected respectively by lines 53, 54 to the control ports 55, 56 of an actuator 50. The actuator comprises a casing 50' in which a piston 57 is slidably mounted. A piston rod 58 carried by the piston extends beyond opposed ends of casing 50' and is operatively connected, for example, to the wheels of the vehicle to be steered.

The casing 31 of the distributor valve has two additional ports 61, 62 connected respectively by lines 63, 64 to the ports 12, 13 of the manually actuated pump 11.

The valve member 28 has three spaced annular grooves 66, 67, 68 defining end portions 69, 71 which close the ports 48, 49 when the valve member is in neutral position and central control portions 72, 73. The annular groove 67 is in communication with port 47 and the central control portions 72, 73 are slightly spaced from ports 51, 52 to provide passageways between port 47 and both ports 51, 52 when the valve member is in neutral position. The ports 61, 62 are in communication with annular grooves 66, 68 in all positions of the valve member 28.

In addition to the ports above mentioned, the casing 31 has a discharge port 76 connected to junction 77 and aligned with a transverse bore 78 in the valve member which is connected by passageway 79 to annular groove 67. The junction 77 is connected by line 81 to port 49 and by line 82 to punction 83 which in turn is connected to line 84. The line 84 is connected to the inlet 85 of a motor actuated high pressure pump 86 and through relief valve 87 to a reservoir 88. In addition, the line 84 is connected to reservoir 88 through one-way valve 89. The outlet of pump 86 is connected by line 91 through one-way valve 92 to line 84 and by line 93 to port 47 of the distributor valve.

In the operation of the system shown in FIG. 1, with the pump 86 actuated and with the valve member 28 of distributor valve 29 in neutral position, fluid under pressure will flow through lines 91 and 93 into port 47 and thence through the small openings associated with ports 51, 52 and through lines 53, 54 into ports 55, 56 of actuator 50'. As a result, the actuator will be pressurized and any gas therein will be compressed proportionally to the back pressure provided for in neutral position of the valve member 28.

In addition, the fluid under pressure will flow through passageway 79 into bore 78, through port 76 aligned therewith to junction 77 and thence through valve 87 to be discharged into the reservoir.

When the steering wheel 26 is rotated, this will cause the helical gear 18 to rotate to drive the helical gear 17 and hence actuate the pump 11. However, as the ports 12, 13 of the pump 11 connected to ports 61, 62 of valve 29 are initially blocked due to the neutral position of valve 28, gear 17 will not rotate at this time. Due to the action of the engaging helical gears 17, 18, as helical gear 17 is restrained from axial movement, the helical gear 18 will tend to move axially, say, inwardly for example. This will cause the sleeve 19 to move inwardly thereby moving the valve member 28 to the right from the neutral position. As a result, the port 76 will be closed and the port 52 will be fully opened so that fluid under pressure from the pump 86 will be delivered completely to the port 56 of the actuator 50'. The return fluid from the actuator will be delivered from port 55 thereof, line 53, through port 51, which is fully opened, into annular groove 66 and thence through port 61, ports 12 and 13 of pump 11, line 64 into port 62 and annular groove 68 which is now connected to port 49 and thence through lines 81, 82 and 84 and valve 87 to the reservoir. As a result of the foregoing, free movement of the piston 57 of the actuator will occur.

Due to the flow of fluid through ports 12, 13 of pump 11, the pump will be actuated by such flow and serve as a motor to turn gear 17 in direction opposed to the initial direction of rotation of gear 18 by wheel 26. This will cause the gear 18 to move to the left to restore the valve member 28 to neutral position.

The procedure is similar when the valve member 28 of the distributor valve 29 is moved to the left by rotation of the steering wheel 26 in the opposite direction.

When rotation of the steering wheel 26 is stopped, the compressed coil spring 41 will restore the valve member 28 to the neutral position shown.

If, for some reason, the pressure in the circuit should increase excessively, the valve 87 will also open to permit discharge.

If there should be failure of the motor driven pump 86, the pump 11 alone will provide sufficient force to effect movement of the piston of the actuator. Thus, when the steering wheel is rotated in direction to move the valve member 28 to the right, fluid under pressure would flow say from port 12 of the pump through ports 61, 51 of the distributor valve into port 55 of the actuator, the fluid being returned from the actuator through port 56, line 54, ports 52 and 47, through the pump 86 and valve 87 to the reservoir.

It is to be noted that since the pump 11 is connected to the low pressure circuit when the pump 86 is operating, it is not necessary to provide any special arrangements for opposing the effect of sudden impact on the wheels of the vehicle being steered.

The embodiment shown in FIG. 2 is similar in many respects to the embodiment shown in FIG. 1 and corresponding parts have the same reference numerals primed.

The distributor valve 29' of FIG. 2 has its ports 51' 52' connected by lines 53', 54' to the control ports 55', 56' of actuator 50'; the ports 61', 62' are connected by lines 63', 64' to the ports 12', 13' of pump 11'. The pump 11' and the valve member 28' of the distributor valve are connected by a helical gear mechanism identical to that shown in FIG. 1 and controlled by a steering wheel 26'. The lines 63' and 64' are connected through one-way valve 101 to a line 102 which is connected to reservoir 88' and by line 103 to the inlet port 85' of a motor actuated pump 86'. The ports 48', 49' of the distributor valve are connected to junction 77' and the port 47' of the distributor valve is connected by line 93' to junction 105. The outlet port 106 of the pump 86' is connected to unloader valve 107, the outlet of which leads through line 108 to reservoir 88'. In addition, the outlet 106 is connected through one-way valve 109 to the unloader valve 107 and to junction 105. The junction 105 is connected to a pressure accumulator 111 of conventional type and to the port 112 of a pressure controlled valve 113. The valve 113 has a transverse wall 114 with an opening therein defining a valve seat and a ball valve 115 is normally urged against said seat by a coil spring 116. A piston 117 subjected to the pressure of the fluid entering port 112 carries a stem 118 which controls the position of ball valve 115. The valve 113 has two chambers 121, 122 positioned on each side of the wall 114 and each having an associated port 123, 124. The port 123 is connected by line 125 to line 102 and the port 124 is connected to junction 126 which leads through one-way valve 127 to line 93' and by line 128 to the port 129 of a spring urged check valve 130, the latter having a discharge port 131 connected by line 132 to line 102.

In the operation of the system shown in FIG. 2, with the valve member in the neutral position shown, fluid under pressure will flow from pump 86' into the accumulator 111 to charge the latter and also into port 112 of valve 113 to move the ball valve 115 off its seat to connect ports 123, 124. The fluid under pressure will also flow from pump 86', through valves 109, into port 47' of distributor valve 29' and through open ports 51', 52' and lines 53', 54' into the control ports 55', 56' of the actuator 50' to pressurize the latter and compress the gas therein.

When steering wheel 26' is rotated, in the manner previously described, the valve member 28' will move to the right to increase the flow of fluid under pressure into port 56' of the actuator. The return fluid from the actuator will flow from port 55' thereof, line 53', port 51', port 61', line 63', through ports 12', 13' of pump 11' and then through line 64', ports 62', 49' of the distributor valve 29' to junction 77.

The fluid will then flow through valve 113 and line 125 to line 102 to reservoir 88' and in the event the pressure is excessive, through valve 130 to the reservoir.

In the event the pump 86' should fail, the charged accumulator 111 will deliver sufficient fluid under pressure to operate the actuator 50'.

If the pump 86' should fail and the accumulator is exhausted, the manually actuated pump 11' will deliver fluid under pressure, say, from port 12' thereof, ports 61', 51' of the distributor valve 29', line 53' to port 55' of the actuator 50' and fluid will return from the actuator from port 56', line 54', ports 52', 47', line 93' to junction 105 and through valve 107 to the reservoir.

As many changes could be made in the above systems, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A position control system comprising a reversible hydraulic actuator having a pair of control ports, a power actuated source of fluid under pressure, a distributor valve interposed between said control ports of said actuator and said source of fluid under pressure, said distributor valve having a movable valve member, said valve member being conformed to provide relatively small passageways when in neutral position between said source of fluid under pressure and said control ports of said actuator, a pair of engaging gears, one of said gears being retained in fixed axial position and the other of said gears being axially movable, means to rotate said axially movable gear to effect axial movement thereof in either of two opposed directions depending upon the direction of rotation thereof, means operatively connecting said axially movable gear to the valve member of said distributor valve, said valve member being conformed to connect said source of fluid under pressure to one of the control ports of said actuator and to connect the other port of said actuator to return when said valve member has been moved a predetermined amount.

2. The combination set forth in claim 1 in which resilient means are provided to retain said valve member in neutral position.

3. The combination set forth in claim 1 in which said distributor valve is of the open center type.

4. The combination set forth in claim 1 in which the distributor valve is of the type having a neutral position and two operating positions and having a return port that is closed in neutral position of the valve.

5. The combination set forth in claim 4 in which a pressure accumulator is provided operatively connected to the outlet of said source of fluid under pressure.

6. The combination set forth in claim 1 in which a manually actuated source of fluid under pressure is provided operatively connected to said first bevel gear, said valve members being conformed to connect said manually actuated source of fluid under pressure to the hydraulic actuator to control the latter.

7. The combination set forth in claim 1 in which said distributor valve has an outlet port, an inlet port connected to said source of fluid under pressure, said valve member having a transverse bore normally aligned with said outlet port when the valve member is in neutral position and a passageway providing communication between said transverse bore and the inlet port.

8. The combination set forth in claim 1 in which said gears are helical gears.

9. The combination set forth in claim 6 in which said manually actuated source of fluid under pressure is a reversible volumetric pump metering the flow of fluid displaced by the hydraulic actuator thereby acting as a follow-up system.

10. The combination set forth in claim 9 in which the reversible volumetric pump meters the return flow of fluid from the hydraulic actuator.

11. A position control system comprising a reversible hydraulic actuator having a pair of control ports, a power actuated source of fluid under pressure, a distributor valve interposed between said control ports of said actuator and said source of fluid under pressure, said distributor valve having a movable valve member, a reversible volumetric pump metering the flow of fluid displaced by the hydraulic actuator, a differential gear arrangement said differential gear arrangement having an input operatively connected to manual control means and two outputs, one of said outputs being operatively connected to said reversible volumetric pump and the other of said outputs being operatively connected to said movable valve member whereby the position of said movable valve member is a function of the differential reaction of the torque exerted on the said manual control means and of the torque of the reversible volumetric pump acting as a pump or as a motor.

References Cited
UNITED STATES PATENTS 2,214,817   9/1940   Harrington.

EDGAR W. GEOGHEGAN, *Primary Examiner.*